United States Patent [19]
Phillippi

[11] 3,837,661
[45] Sept. 24, 1974

[54] CHUCK SLEEVE
[75] Inventor: Edward F. Phillippi, Palos Verdes Peninsula, Calif.
[73] Assignee: Excellon Industries, Torrance, Calif.
[22] Filed: June 21, 1972
[21] Appl. No.: 264,897

[52] U.S. Cl............... 279/1 C, 279/1 A, 279/1 SG, 279/41, 403/290
[51] Int. Cl............................................ B23b 31/14
[58] Field of Search............ 279/1 A, 1 C, 1 SG, 41, 279/42, 48, 4, 43, 23, 96, 102; 408/82; 403/289, 290, 292, 315, 371, 372

[56] References Cited
UNITED STATES PATENTS
| 1,729,862 | 10/1929 | Becker | 408/82 |
| 1,765,362 | 6/1930 | Berry | 279/1 A |
| 2,432,860 | 12/1947 | Clatfelter | 279/1 A |
| 3,691,883 | 9/1972 | Ingram | 279/1 A X |
| 3,709,508 | 1/1973 | Dudley | 279/1 C |

FOREIGN PATENTS OR APPLICATIONS
| 96,805 | 5/1924 | Austria | 279/1 C |

Primary Examiner—Andrew R. Juhasz
Assistant Examiner—Z. R. Bilinsky
Attorney, Agent, or Firm—Gausewitz, Carr & Rothenberg

[57] ABSTRACT

A sleeve for the tool receiving bore of a chuck is formed with a number of longitudinal slits, a stop collar at one end and a peripheral retaining bead at the other end. The sleeve is interposed between the conventional gripping members of the chuck collet and the inserted tool shank. Forces exerted by the gripping members are transmitted to the tool shank through the sleeve. When used in a chuck having several centrifugally urged holding members the sleeve keeps the holding members from flying out of the chuck body when the chuck is rotated without a tool inserted therein and maintains apertures of the holding member in alignment to facilitate insertion of a tool. The sleeve is made in different wall thicknesses to enable use of tool shanks of different diameters in the same chuck collet.

12 Claims, 5 Drawing Figures

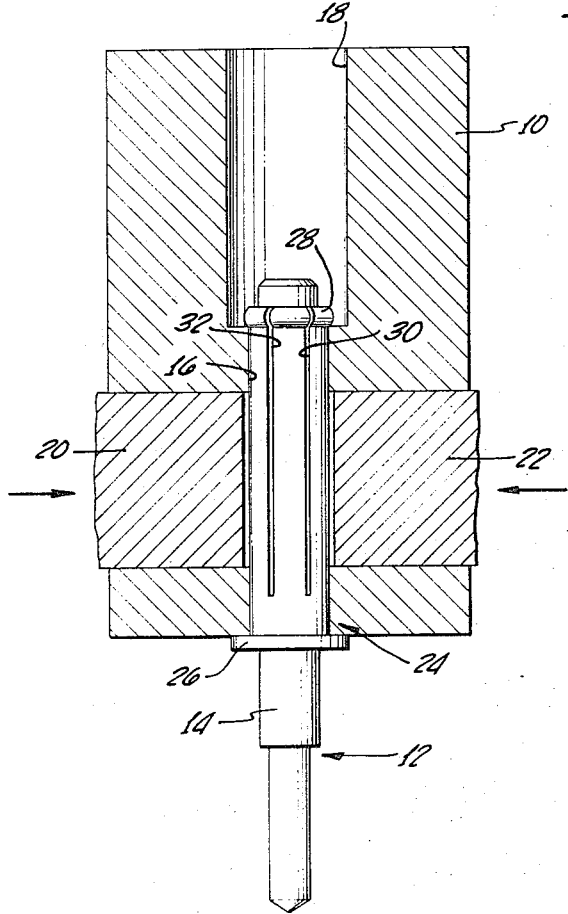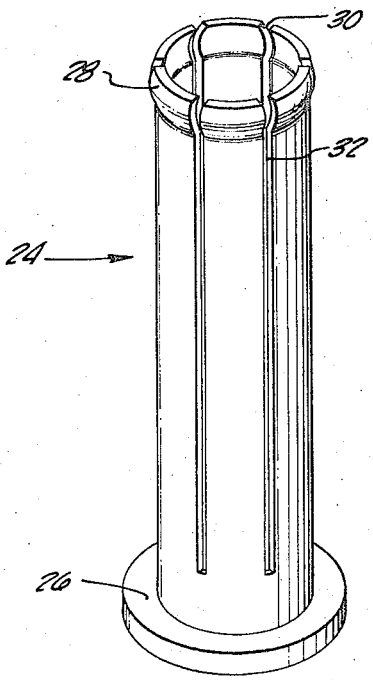

CHUCK SLEEVE

BACKGROUND OF THE INVENTION

The present invention relates to chuck assemblies for driving rotatable shafts and more particularly concerns an insert that may be employed with different types of chuck assemblies.

Among the many types of chuck assemblies a number employ centrifugal forces of rotation for holding a tool shank. Centrifugal chucks are of wide use but are at present most commonly used in high speed application since the centrifugal forces are directly related to rotational velocity. Typical examples of such centrifugal chucks are described in U.S. Pat. No. 3,467,404 to C. T. Sloan and U.S. Pat. No. 3,573,876 to John W. Powell. In the Sloan and Powell patents radially directed centrifugal forces are applied directly to the tool shaft by means of weighted holding members. U.S. Pat. Nos. 2,356,245 and 2,431,961 and 2,394,861 are typical of those centrifugal chuck assemblies that employ holding members pivoted or flexed by centrifugal force. U.S. Pat. Nos. 1,990,525 and 2,495,050 show complex arrangements for employing and wedging action, not upon the tool inself but upon the conventional tool gripping member.

In a co-pending application of a Francis Dudley, Ser. No. 88,610 filed Nov. 12, 1970, and assigned to the assignee of the present invention, the disclosure of which is incorporated herein by this reference as though fully set forth, a pair of centrifugally urged wedges exert opposing camming forces directly on a given tool shank. In the arrangement of the co-pending application of Dudley and also those shown by the above mentioned patents to Sloan and Powell there is always the danger that the chuck may be rotated without a tool inserted. In such case, the holding members will fly out of the chuck body at high speed, causing damage to persons and equipment in the vicinity. To avoid this problem the patent to Sloan suggests the use of an external sleeve that is a press fit upon the chuck body. Although such a sleeve will retain the centrifugal holding members in place, it prevents any further access to these members as may be required to facilitate insertion of a tool, and prevents ready placement of these holding members. It has also been suggested to provide an external guard sleeve that is fixed to the drill body, not rotating with the chuck body. Such an arrangement may cause damage to the chuck driving motor due to the fact that the holding members, when driven outwardly, will frictionally engage the inside of the guard, thereby imposing an unacceptable load on the motor.

Another disadvantage of many different types of chuck assemblies that is even more pronounced in the centrifugal arrangements of Sloan, Powell and the above identified Dudley patent application, derives from the fact that the tool receiving bore, and concomitantly the apertures of the centrifugal holding members, must be dimensioned to fairly close tolerances so as to provide a relatively snug fit about the shank of the driven tool. Thus, tools of different diameters are not readily employed. for this reason, it is common to make a set of tools such as drill bits, for example, of different drill sizes but all having the same diameter shank so that the bits of different sizes may be employed in the same chuck assembly. However, this is quite wasteful of the relatively expensive drill bit material since a one-sixteenth bit for example may be made with a ⅛ inch shank solely to enable use in a given chuck assembly.

Still another problem with the centrifugal chuck assemblies of Sloan, Powell and the Dudley application arises from the fact that resilient holding means are provided to force the holding members inwardly. This action misaligns the apertures of the holding members, relative to the chuck body aperture. Thus, to insert a tool shank, the latter is provided with a chamered end that acts as a cam to pry apart and realign the holding members in their chuck body mounting. Where the tool insertion is performed manually, this need to realign the apertures of the centrifugal holding members requires additional time for a given change of bits. Where the centrifugal chuck assembly is employed in a machine of the type that automatically changes bits, a more serious problem arises. The amount of misalignment will vary from one chuck assembly to another and from time to time for a given chuck assembly. Therefore, it may happen that upon automatic insertion of a new bit, the misalignment of centrifugal holding members is such as to create an unacceptably large force upon the bit, resulting in a broken bit.

Accordingly it is an object of the present invention to provide an insert for a chuck that will substantially eliminate or minimize the above-mentioned problems and which may be readily employed without any significant modification of existing chuck assemblies.

SUMMARY OF THE INVENTION

In carrying out principles of the present invention in accordance with a preferred embodiment thereof, an insert is provided for use in the bore of a chuck body having holding members mounted to the body. The insert is resilient and provided with an enlargement on one end thereof that causes it to be resiliently compressed as it is inserted into the chuck body bore, but allows the insert to expand to closely engage the bore when the enlargement is received in an enlarged portion of the bore. When used in a centrifugal chuck assembly, the insert extends between opposed gripping surfaces of the centrifugal holding members so as to firmly retain these within the chuck body and in alignment with the chuck bore. Wall thickness of the sleeve may be varied from one sleeve to another to accomodate shanks of differing diameters.

BRIEF DESCRIPTION OF THE DRAWINGS

FIG. 1 is a sectional view of a chuck body having a sleeve of the present invention inserted therein.

FIG. 2 is a pictorial view of the sleeve shown in FIG. 1.

DETAILED DESCRIPTION

Figure 3:
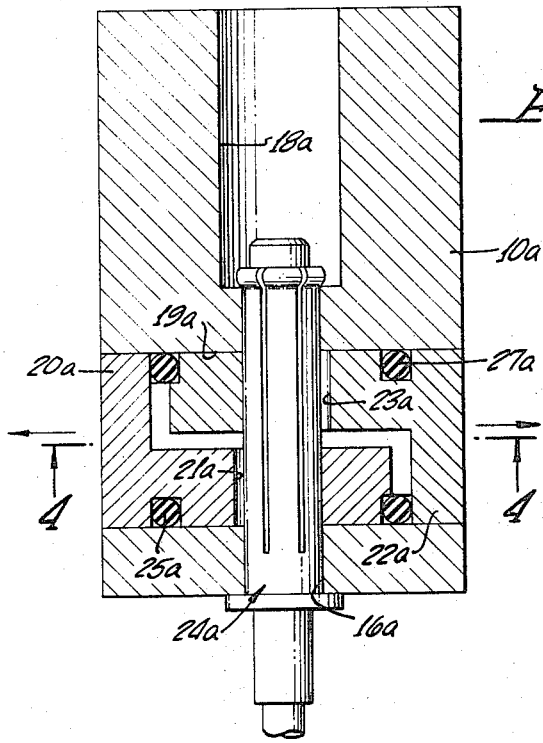
FIG. 3 is a cross-sectional view of one type of centrifugal chuck assembly showing an insert or sleeve of the present invention inserted therein.

As illustrated in FIG. 1, a chuck assembly having an insert of the present invention includes a chuck body 10 that is adapted to hold and impart rotation to a member such as a rotary tool 12 having a shank 14. Shank 14 is preferably but not necessarily of a circular cross-section. Chuck body 10 may comprise a spindle or other cylindrical body that is integral with, or fixedly attached by well known means to a driven shaft or other conventional rotational means (not shown), so as to rotate the tool 12. The latter may comprise any conventional tool such as a twist drill, rotary cutter or the like, or other type of rotating member having a shank 14 that extends into an axial cylindrical bore 16 formed in the chuck body 10. The bore 16 is of relatively small diameter at the outer portion of the bore adjacent the end of the chuck body, and has an enlarged inner portion 18.

Illustrated schematically in FIG. 1 are holding members 20, 22 that are urged by conventional means (not shown) inwardly as indicated by the arrows to bear upon the shank of a tool inserted in the chuck body, and thereby to secure the tool for rotation by the chuck assembly. The gripping or holding members 20, 22 schematically represent various types of holding arrangements of know chuck assemblies such as, for example, the gripping fingers of a split collet, pivoted or flexed gripping members of a centrifugal collet, and wedge drived gripping members or centrifugal holding members of the type employed in the above identified patents to Sloan, Powell and the above identified patent application of Dudley. In all of these arrangements, and in the absence of the sleeve insert of the present invention, the gripping members 20, 22 are urged directly against the shank 14 of the tool 12 when the shank is inserted in the axial bore 16.

In accordance with the present invention, a resilient sleeve 24 is interposed between the tool shank and those portions of the gripping members 20, 22 that normally directly engage the tool shank. Sleeve 24 is preferably formed of a high strength material such as hardened steel, for example, and has an outside diameter that allows the sleeve to be a snug but sliding fit in the smaller diameter portion of bore 16. Rigidly secured to the outer end of the sleeve is an annular collar 26. A radially outwardly projecting enlargement in the form of a continuous peripheral bead 28 is formed on the upper end of the sleeve.

A number of slits 30, 32 extend longitudinally of the sleeve from the upper end, through the peripheral bead 28, toward the lower end of the sleeve. As illustrated in FIG. 2, these slits stop short of the lower end of the sleeve. The number of slits may be varied as deemed necessary or desirable. In the illustrated arrangement, six equally spaced slits are provided, formed in three pairs of diametrically opposed slits. With this arrangement, the upper or beaded end of the sleeve may be inwardly compressed, and the resilience of the steel sleeve walls will cause the sleeve to resume its unstressed normal configuration upon release of compressive force exerted on the sleeve.

In use, the sleeve is inserted into the bore 16 of the chuck body 10 with the peripheral bad 28 being inserted first. The rounded forward edges of the bead 28 act as a camming surface and cooperate with the internal surface of the bore 16 to cause the sleeve to be radially inwardly compressed. In such a compressed condition the sleeve is inserted through the entire length of the relatively small diameter portion of bore 16 until the collar 26 seats on the lower end of the chuck body 10. In this position, further penetration of the sleeve into the chuck body is prevented. However, in this position, the bead 28 clears the inner end of the relatively small diameter portion of bore 16, so that the bead is now positioned in the enlarged bore portion 18 as shown in FIG. 1. There is no longer any radially inwardly compressive force acting on the sleeve, which then resiliently resumes its normal configuration, in close contact with the internal surface of the bore 16.

To remove the sleeve from the chuck body 10, it is simply pulled axially downwardly, as viewed in the illustration of FIG. 1, which causes the bead 28 to again be cammed against the internal surface of the smaller diameter portion of bore 16 to again compress the upper end of the sleeve and allow it to be fully withdrawn from the chuck body.

With the sleeve 24 in place as illustrated in FIG. 1, gripping 20, 22 cannot penetrate any further into the bore 16. Thus, a free and unobstructed bore is provided to receive the tool shank 16.

It will be readily appreciated that the sleeve 24 may be made with different wall thicknesses. Thus, a group of different sleeves all having the same external diameter that snugly fits the interior of the bore 16 may be made with different internal diameters of which each corresponds to a different bit size. Accordingly when a bit of different size is to be employed, the previous sleeve will be removed and a new sleeve having a different wall thickness (a difficult internal diameter) will be inserted in its place. In this manner, different sizes of conventional bits (having a shank of the same diameter as the fluted portion) may be readily employed. Of course, the sleeve may also be used with groups of different size bits, all of which have a common shank diameter. For example, a group of bits from 0 to 1/16 inches in cutting diameter may be made, all having the same shank diameter, such as one-sixteenth for example. A sleeve having an internal diameter of 1/16 inches would be used for this group. A second group of bits ranging in size from 1/16 to ⅛ inches may be made, all having the same shank diameter, such ⅛ inches for example. For use with this group of bits, there is employed a sleeve having the same outer diameter, but having an inner diameter that matches the ⅛ inches shank diameter of the bits in this group.

The stiffness of the sleeve is great enough to insure that the peripheral bead 28 will retain the sleeve within the bore 16. Nevertheless, this stiffness is not sufficiently great to provide any undue resistance to the inwardly directed forces exerted by the gripping members 20, 22. Accordingly, when these gripping members are urged inwardly into tool holding positions, they will exert a force upon the outer sides of the sleeve 24 which causes the sleeve to slightly compress inwardly, thereby tightly gripping the shank 14 of the tool that is inserted in the sleeve.

Figure 4:
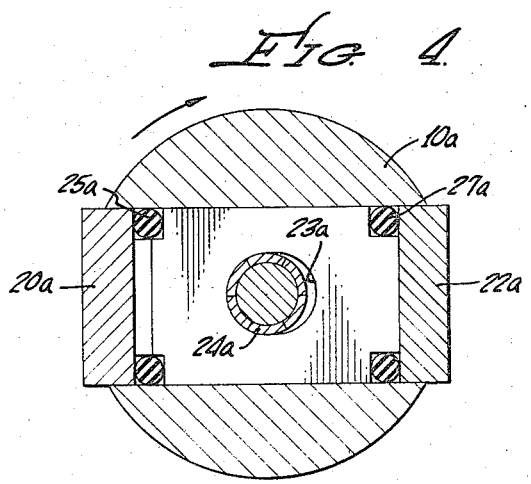
FIG. 4 is a cross-section through the chuck assembly of FIG. 3.
Figure 5:
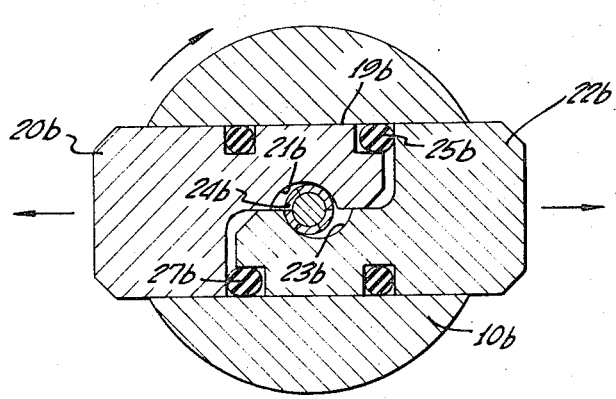
FIG. 5 is a cross-section through another type of centrifugal chuck assembly in which the sleeve of the present invention may be employed.

Significant advantages of the described sleeve in centrifugal chuck assemblies may be best understood in connection with the illustrations of FIGS. 3, 4 and 5. Shown in FIG. 3 is a sleeve 24a which is identical with the sleeve 24 of FIGS. 1 and 2, but employed in a centrifugal chuck assembly of the type shown and described in detail in U.S. Pat. No. 3,573,876 to J. W. Powell. This centrifugal chuck assembly includes a chuck body 10a having a relatively small diameter axial bore portion 16a and an enlarged portion 18a. Body 10a is formed with a transverse bore 19a in which is mounted a pair of identical gripping members 20a and 22a. The gripping members each has an inner portion formed with an aperture 21a, 23a respectively. Resilient washers 25a, 27a are interposed between the two gripping members to urge these radially apart and thus provide an initial relatively small amount of gripping action.

In use of the centrifugal chuck assembly illustrated in FIG. 3, assuming that the sleeve 24a is not employed, a tool shank is inserted into the bore 16a from the bottom of the assembly as viewed in FIG. 3, and as it is inserted, forces the holding members 20a and 22a radially apart, so that their apertured inner portions are in axial alignment with the axis of the bore 16. Substantially, as the chuck assembly is rotated, centrifugal force causes the two gripping members to tend to move outwardly of the chuck body thereby exerting a centrifugal gripping action upon the tool shank. However, should the assembly be rotated without a tool inserted therein, the two gripping members in the absence of any external protective sleeve and, further, in the absence of the internal sleeve of the present invention would fly outwardly at great speed, possibly causing damage to property and injury to persons.

According to the present invention, the sleeve 24a is resiliently inserted and retained in the relatively narrow diameter bore portion 16a. The sleeve has an external diameter that is a snug fit with the internal diameter of this bore portion. Sleeve 24a resists motion of the gripping members 20a and 22a that is urged by the resilient washers 25a and 27a and thereby holds these members in exact axial alignment with the chuck body bore. Thus, insertion of the tool shank into the chuck body is greatly facilitated. Further, should the chuck assembly be rotated with sleeve 24a in place but without any tool or tool shank in place, the gripping members 20a and 22a are retained within the transverse bore by the sleeve.

With a tool shank inserted in the sleeve, rotation of the chuck assembly causes the gripping members to tend to move outwardly of the chuck body under centrifugally generated forces to thereby inwardly compress the resilient sleeve and cause the latter to grip the tool shank inserted therein. As previously described, sleeves of different wall thickness may be employed to accommodate different size bits.

Illustrated in FIG. 5 is a cross section of a centrifugal chuck assembly of the type more particularly shown and described in detail in the above identified copending application of Frances Dudley. The chuck assembly of the Dudley patent application includes a chuck body 10b having an axial bore that is intersected by a transverse bore of chamber 19b. Slidably mounted in the transverse bore 19b are centrifugally operated wedges 20b and 22b. The wedges are formed with inner camming portions 21b and 23b that cooperate to form an aperture that is axially aligned with the chuck body tool receiving bore by the sleeve 24b. Sleeve 24b may be identical to the sleeves 24 and 24a previously described. It is inserted in the chuck body bore and operates exactly in the same manner as the previously described sleeves. Washers 25b and 27b are interposed between the gripping members 20b and 22b, tending to urge these apart. The outer ends of the gripping members may be grasped between the thumb and forefinger and pressed inwardly to align the apertures formed in the inner portions of the wedges thereby to facilitate insertion of the sleeve 24b.

As described in further detail in the co-pending application of Francis Dudley, the inner portions of the centrifugal wedges shown in FIG. 5 are formed with substantially semicircular wedging or camming surfaces having a diameter greater than the diameter of the axial bore of the chuck body 10b. Thus, as the gripping members 20b and and 22b tend to move outwardly under centrifugally generated forces, these camming surfaces exert mutually opposed gripping forces that force the interposed resilient sleeve against the shank of the inserted tool thereby to lock the tool to the chuck assembly. As in the previously described arrangements, the use of the sleeve facilitates insertion of the tool shank by maintaining the gripping members in alignment with the chuck body bore and also retains the gripping members within the chuck body in the event that the chuck is rotated without a tool therein. Further, use of sleeves of different wall thickness, as previously described, will facilitate use of the chuck assembly with tools of different diameter.

There has been described a sleeve insert for tool holding chucks having unique advantages for certain types of centrifugal chuck assemblies, and which is readily adaptable for use without modification of existing aparatus.

The foregoing detailed description is to be clearly understood as given by way of illustration and example only, the spirit and scope of this invention being limited solely by the appended claims.

I claim:

1. In a centrifugal chuck assembly having a chuck body formed with an axial tool receiving bore, a transversely extending chamber in the body intersecting said bore, and a pair of centrifugal holding members slidably mounted in said chamber for radially outward motion in mutually opposite directions in response to rotation of said chuck body, each said holding member having a tool shank engaging surface adapted to exert a holding force upon a tool inserted in said chuck body bore, the improvement comprising
   a sleeve lining said chuck body bore and interposed between said tool shank engaging surfaces of said first and second centrifugal holding members,
   said sleeve being inwardly resilient, whereby upon rotation of said chuck body said centrifugal holding members exert inwardly directed forces upon the sleeve to thereby cause the sleeve to grasp a tool shank inserted in said chuck body bore, and whereby when said chuck body is rotated without a tool shank being positioned within said bore said centrifugal holding members are retained within said chuck body by said sleeve.

2. The assembly of claim 1, wherein said axial bore has an enlarged portion and wherein said sleeve has an enlarged inner end positioned within said enlarged bore portion.

3. The chuck assembly of claim 1, wherein said sleeve includes at least one slit extending longitudinally thereof from said inner end of the sleeve.

4. A chuck assembly comprising:
  a. a chuck body adapted to be rotated and to impart such rotation to member extending into the body, said body having an axial bore adapted to receive a member to be rotated by the chuck and having an enlarged portion, b. gripping means movably mounted in the chuck body and adapted to be forced toward a gripping position to hold a member inserted in said bore, and c. a resilient sleeve positioned in the bore and adapted to receive a member to be rotated by the chuck, said sleeve being interposed between said gripping means and said member whereby said gripping means may be forced toward said gripping position to force said resilient sleeve against a member inserted in said bore, said sleeve having a bead formed on one end thereof and received in said enlarged bore portion for retaining the sleeve within said bore.

5. The chuck assembly of claim 4, wherein said chuck body has a substantially transversely extending chamber intersecting said axial bore, and wherein said gripping means comprises a pair of wedges mounted in said chamber for motion therein in mutually opposite directions outwardly of said body in response to centrifugal forces exerted on the wedges by rotation of the body, each said wedge having an outer massive portion offset from the axis of rotation of said body in a direction substantially along the extent of said chamber and having an inner camming portion having a camming surface, said camming portions of respective ones of said wedges being positioned on respectively opposite sides of a plane containing said axis of rotation.

6. A chuck assembly comprising:
a. a chuck body adapted to be rotated,
said body having an axial bore adapted to receive a member to be rotated by the chuck,
said bore having an enlarged inner portion and a relatively small diameter outer portion for receiving said member,
b. gripping means movably mounted in the chuck body and adapted to be forced toward a gripping position to hold a member inserted in said axial bore,
c. a resilient sleeve positioned in said axial bore and adapted to receive a member to be rotated by the chuck,
said sleeve having an outside diameter substantially equal to the inside diameter of said relatively small diameter bore portion and having a radially outwardly extending protuberance formed on one end thereof, whereby said sleeve may be inserted into said relatively small diameter bore portion with said protuberance coacting with the chuck body bore to compress said one end of the sleeve as it progresses through the bore, and whereby said sleeve may expand when said protuberance enters the enlarged inner bore portion to retain the sleeve in said bore.

7. The chuck assembly of claim 6, wherein said sleeve is formed with at least one longitudinally extending slit that enables said one end of the sleeve to be inwardly compressed into a lesser diameter.

8. The chuck assembly of claim 7, including means on the other end of said sleeve for limiting motion of the sleeve into said bore.

9. The chuck assembly of claim 7, wherein said gripping means comprises a pair of holding members movably mounted to the chuck body for motion in outward directions relative to said body in response to centrifugal forces exerted by rotation of the body, each said holding member including a holding surface adapted to press said resilient sleeve against a member inserted therein.

10. The chuck assembly of claim 9, wherein each said holding member includes an outer massive portion and an inner portion having an aperture substantially aligned with said chuck body axial bore, said sleeve extending through said bore and through both of said holding member apertures to thereby retain said holding members to said chuck body.

11. The chuck assembly of claim 6, wherein said chuck body has a substantially transversely extending chamber intersecting said axial bore and wherein said gripping means comprises a pair of wedges mounted in said chamber for motion therein in mutually opposite directions in response to centrifugal forces exerted on the wedges by rotation of the body, each said wedge having an outer massive portion offset from the axis of rotation of said body in a direction substantially along the extent of said chamber and having an inner camming portion having a camming surface, said camming portions of respective ones of said wedges being positioned on respectively opposite sides of a plane containing said axis of rotation.

12. The chuck assembly of claim 11, wherein said sleeve is one of a group of substantially identical interchangeable sleeves, each having the same outside diameter but each having a different wall thickness to accommodate inserted members of different diameters.

* * * * *

O-1050
5/69)

UNITED STATES PATENT OFFICE
CERTIFICATE OF CORRECTION

Patent No. 3,837,661           Dated September 24, 1974

Inventor(s) Edward F. Phillippi

It is certified that error appears in the above-identified patent and that said Letters Patent are hereby corrected as shown below:

Claim 3, line 1 (Column 6, line 58): change "1" to ---2---.
Claim 4, line 3 (Column 6, line 63): after "to" and before "member", insert ---a---.

Signed and sealed this 17th day of December 1974.

(SEAL)
Attest:

McCOY M. GIBSON JR.           C. MARSHALL DANN
Attesting Officer           Commissioner of Patents